June 13, 1961 E. PELL 2,988,683
MOTOR CONTROL SYSTEM
Filed June 14, 1957 4 Sheets-Sheet 4

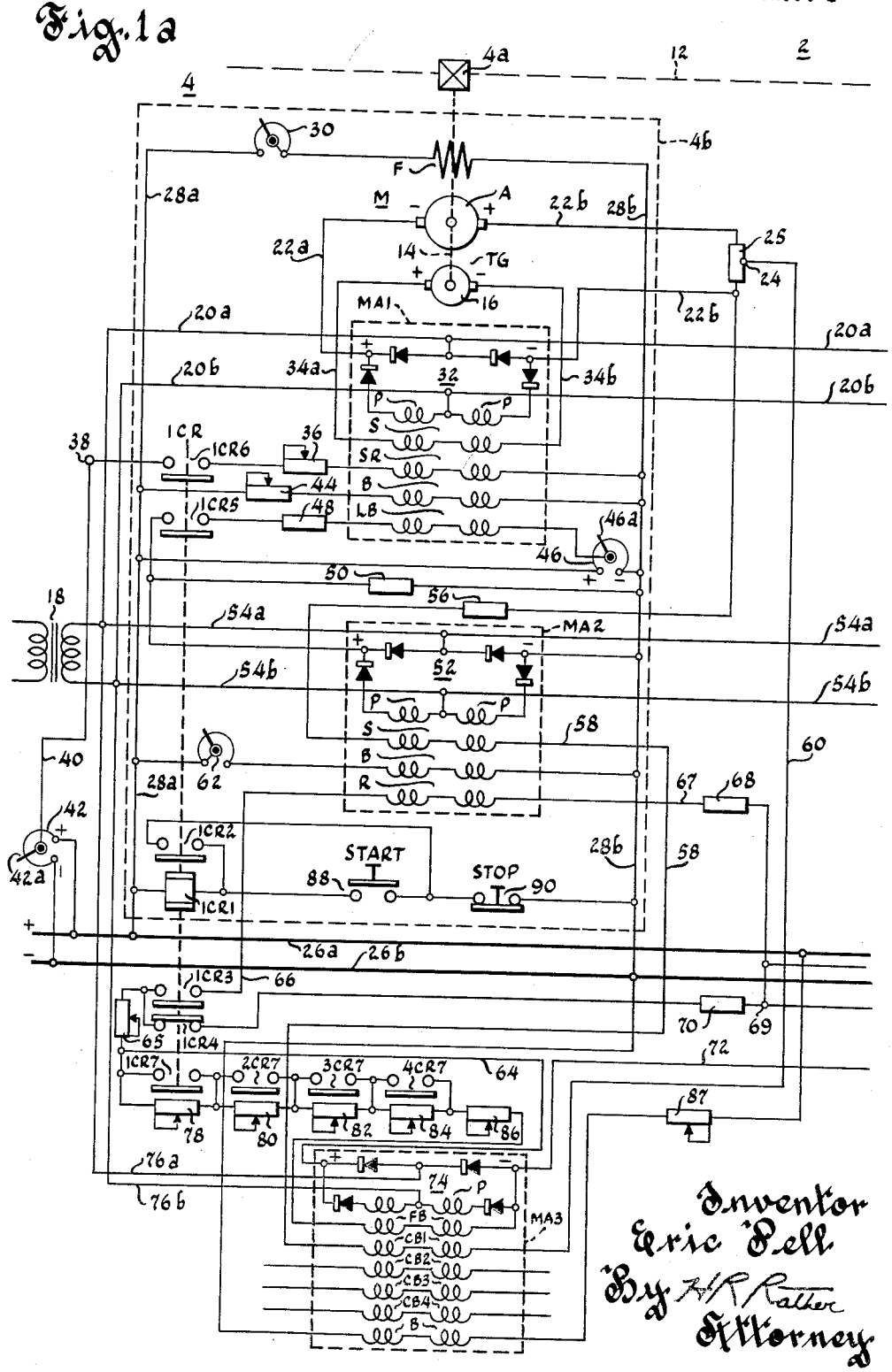

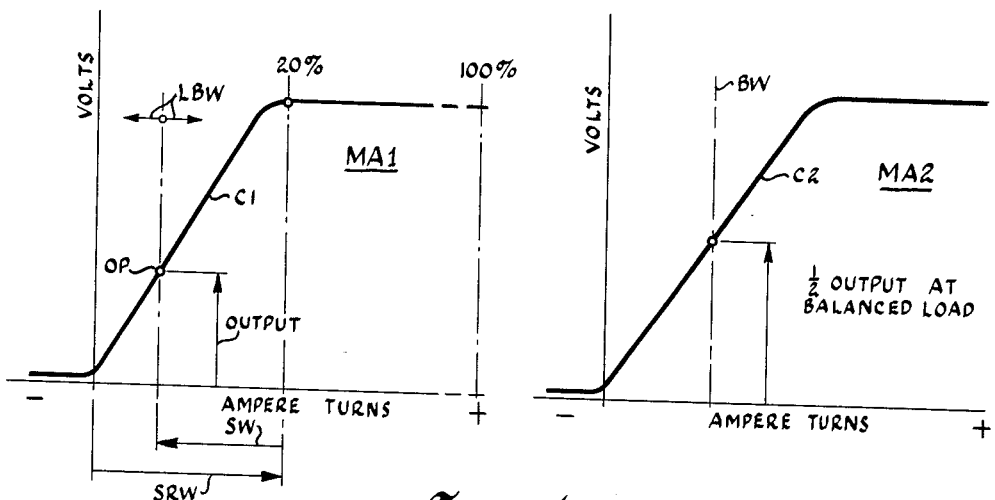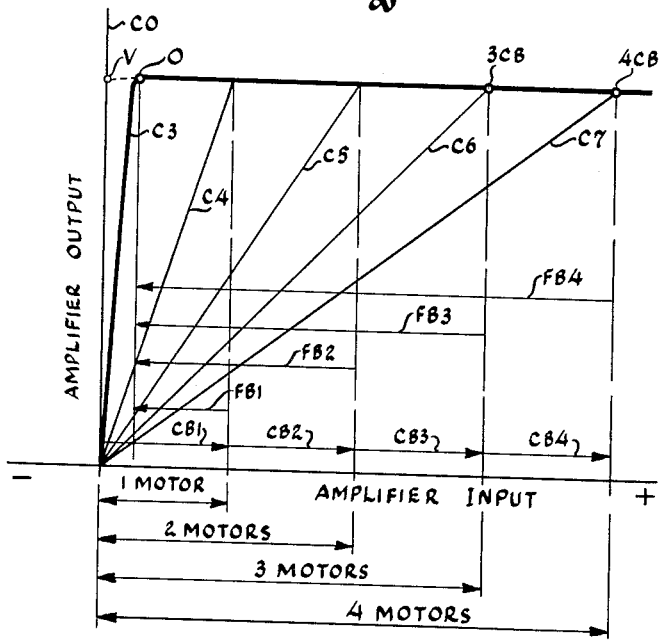

Inventor
Eric Pell
By H R Rather
Attorney

United States Patent Office 2,988,683
Patented June 13, 1961

2,988,683
MOTOR CONTROL SYSTEM
Eric Pell, Wauwatosa, Wis., assignor to Cutler-Hammer, Inc., Milwaukee, Wis., a corporation of Delaware
Filed June 14, 1957, Ser. No. 665,858
18 Claims. (Cl. 318—99)

This invention relates to electrical motor control systems and more particularly to load balancing systems for plural motor drives.

In graphic arts machinery such as printing presses and the like where a plurality of motor drive sections are operated in synchronism to drive a common shaft, it has heretofore been proposed to supply the individual motors from a common generator to provide proper load division between the motors. In order to provide greater flexibility affording modification of the drive system, it has been found desirable to provide individual generating or energizing control units for the respective drive sections so as to permit declutching one or more sections and operating the latter independently of the remaining sections. The aforementioned modifications must be accomplished without altering the predetermined load division between the motors in such remaining sections.

Accordingly, it is a primary object of the present invention to provide improved means affording the aforementioned and other control functions.

A specific object of the invention is to provide improved means for controlling the speeds of and for selectively rendering individual motors of a plural motor drive system effective or ineffective while affording predetermined load division between the effective motors.

A more specific object of the invention is to provide improved control means for disconnecting a selected motor from a plural motor speed regulated drive for independent operation without unbalancing the load between the remaining motors.

Another object of the invention is to provide a control system for a plural motor drive having improved means for selectively adjusting among the motors the relative portions of the total load shared thereby and for automatically reapportioning the total load among a different number of motors when selected motors are rendered effective and ineffective.

A further object of the invention is to provide such control system with improved means for measuring and totalizing the loads of the motors and automatically controlling such loads when an additional motor is actively connected in the system.

Other objects and advantages of the invention will hereinafter appear.

While the invention hereinafter described is effectively adapted to fulfill the object stated, it is to be understood that I do not intend to confine my invention to the particular preferred embodiment of control system disclosed inasmuch as it is susceptible of various modifications without departing from the scope of the appended claims.

Figure 1B:
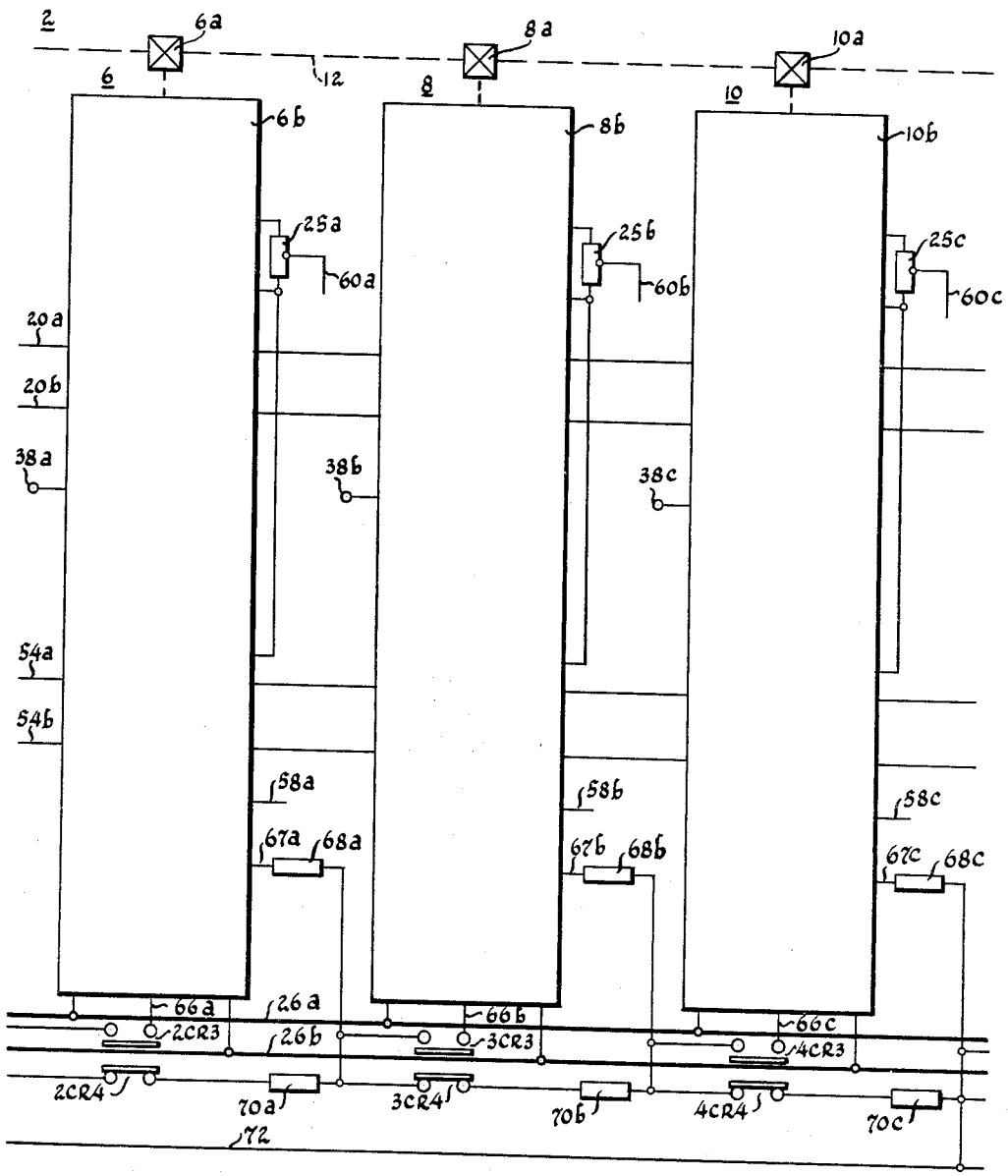
Figure 5:
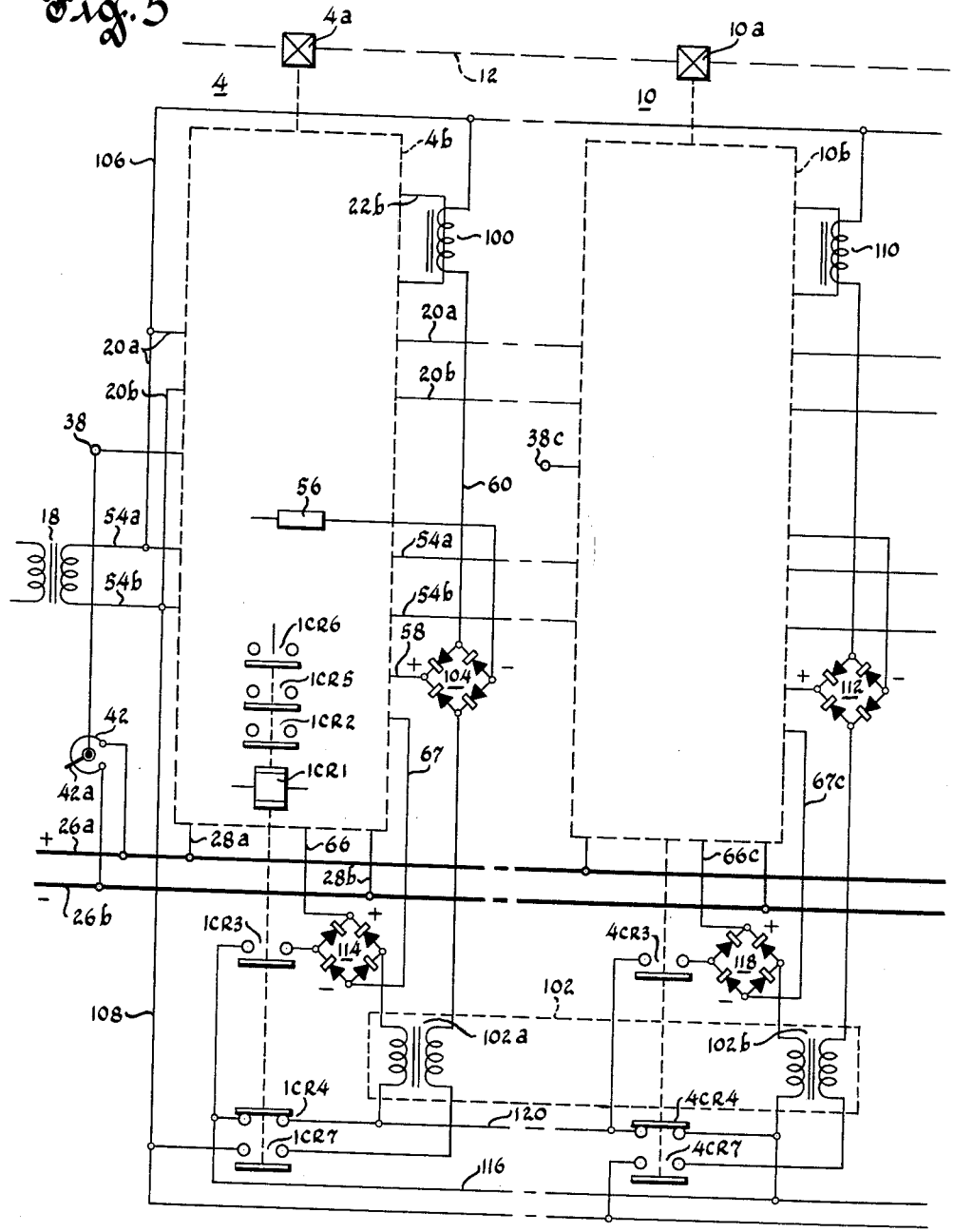

In the drawings, FIGURES 1a and 1b constitute a partly schematic and partly diagrammatic illustration of a control system constructed in accordance with the present invention;

FIG. 2 graphically depicts the operating characteristics of the motor armature supply magnetic amplifiers employed in the system of FIGS. 1a and 1b;

FIG. 3 graphically depicts the operating characteristics of the load balancing magnetic amplifiers shown in FIGS. 1a and 1b;

FIG. 4 is a graph showing the operating characteristics of the totalizing device of FIG. 1a; and FIG. 5 is a partly schematic and partly diagrammatic illustration of a modification of the invention.

The system shown in FIGS. 1a and 1b is provided with a drive indicated generally as 2, such as is used on printing presses and the like, having a plurality of sections 4, 6, 8 and 10, as required, drivingly connected to a common driven shaft 12. The driving sections are provided with respective clutches 4a, 6a, 8a and 10a or the like for clutching each section in driving engagement with, or declutching each section from, common shaft 12 thereby to permit operating a disconnected section independently of the rest of the drive.

The driving sections are also provided with control networks 4b, 6b, 8b and 10b, respectively. Networks 6b, 8b and 10b are identical to the network 4b portion of section 4 within the broken lines and therefore are schematically shown for simplicity.

As shown in detail in connection with network 4b, each of the networks comprises an electrical motor M preferably of the direct current shunt wound type having an armature A and a shunt field winding F. Armature A is connected through a shaft 14 to armature 16 of a tachometer generator TG and to clutch 4a for coupling the same to shaft 12. For reasons of simplicity, the tachometer generator field winding has not been shown.

Power is connected to armature A of motor M from an alternating current power supply source (not shown) through the usual on-off switches to the primary winding of transformer 18 and then through its secondary winding, conductors 20a and 20b, power windings P of magnetic amplifier MA1, and the motor armature circuit comprising conductors 22a and 22b, conductor 22b having an "ammeter shunt" resistor 25 in series connection therein for reasons hereinafter described. Shunt field winding F of motor M is connected to a direct current power supply source (not shown) through the positive and negative conductors 26a and 26b running horizontally along the lower portions of FIGS. 1a and 1b, conductors 28a and 28b and speed adjusting vernier rheostat 30. Although magnetic amplifiers of the saturable reactor type such as MA1 have been shown for supplying the motor armature windings, it will be apparent that other means such as rotating regulators and generators could be used in place thereof if desired.

The motor armature supplying magnetic amplifier MA1 comprises a full wave rectifier bridge 32 having the usual rectifiers connected in each of the four branches thereof with the left-hand and right-hand power windings P in series connection, respectively, in two of the branches. The input terminals of rectifier bridge 32 are connected to the secondary winding of transformer 18 through conductors 20a and 20b while the positive and negative output terminals of the bridge, corresponding to the output terminals of the amplifier, are connected through conductors 22a and 22b to armature A as aforesaid. Conductors 20a and 20b extend further to networks 6b, 8b and 10b to connect the corresponding magnetic amplifiers in parallel, and to additional drive sections as desired.

Amplifier MA1 further comprises a pair of series connected signal windings S connected to armature 16 of tachometer generator TG through conductors 34a and 34b. In addition, amplifier MA1 is provided with pairs of speed reference windings SR, bias windings B and load balancing windings LB. Speed reference windings SR are connected in series to the direct current source through conductors 26b and 28b, adjustable resistor 36, normally open contacts 1CR6 of a recalibrating control relay 1CR, terminal 38 and conductor 40 to adjustable arm 42a of a speed setting rheostat 42, the opposite ends of rheostat 42 being connected through conductors 26a and 26b to the direct current source. Terminal 38 is also connected to terminals 38a, 38b and 38c for energization of the speed reference windings of corresponding amplifiers in networks 6b, 8b and 10b, the connections being omitted from FIG. 1 for the sake of simplicity. Bias windings B are series connected with an adjustable resistor 44 across conductors 28a and 28b. Load balancing windings LB are connected in series in one branch of a parallel circuit connected across the positive and negative output terminals of a load balancing magnetic amplifier MA2 and having in series connection with windings LB in one branch thereof the negative end portion and adjustable arm 46a of a load balancing rheostat 46, resistor 48 and normally open contacts 1CR5 of the aforementioned relay 1CR, and in the other branch a resistor 50; the opposite ends of rheostat 46 being connected across conductors 28a and 28b.

Load balancing amplifier MA2 of the saturable reactor type comprises a full wave rectifier bridge 52 having the usual rectifiers connected in each of the four branches thereof, and a pair of power windings P with one of the latter in series connection in each of two branches of the bridge. The input terminals of rectifier bridge 52 are connected to the secondary winding of transformer 18 through conductors 54a and 54b while the positive and negative output terminals of the bridge, corresponding to the output terminals of the amplifier, are connected to the load balancing windings LB of amplifier MA1 as hereinbefore described. Conductors 54a and 54b extend further to networks 6b, 8b and 10b to supply the corresponding magnetic amplifiers in parallel and to additional drive sections as desired.

Amplifier MA2 is further provided with pairs of signal windings S, bias windings B and reference windings R. Signal windings S are series connected in a circuit exteding from one end of resistor 25 in the motor armature circuit through resistor 56, conductor 58, current balancing windings CB1 of a totalizing magnetic amplifier MA3 and conductor 60 to tap 24 of resistor 25. Bias windings B are series connected with an adjustable rheostat 62 across conductors 28a and 28b. Reference windings R are connected in series in one branch of a parallel circuit connected to the positive and negative output terminals of amplifier MA3. This circuit extends from the positive output terminal of amplifier MA3 through conductor 64 and adjustable resistor 65 where it divides. One branch extends through normally open contacts 1CR3 of relay 1CR, conductor 66, windings R, conductor 67 and resistor 68 to common point 69, while the other branch extends through normally closed contacts 1CR4 of relay 1CR and resistor 70 to common point 69 and then through resistors 70a, 70b and 70c, contacts 2CR4, 3CR4 and 4CR4 and conductor 72 to the negative output terminal of amplifier MA3. The reference windings of corresponding amplifiers in control networks 6b, 8b and 10b are series connected with normally open contacts 2CR3, 3CR3 and 4CR3 of corresponding relays therein and resistors 68a, 68b and 68c across resistors 70a, 70b and 70c, respectively. This arrangement affords operation, upon energization of the associated relay, of selected drive sections in combination while permitting independent operation of the remaining drive sections as hereinafter described.

Totalizing amplifier MA3 of the saturable reactor type comprises a full wave rectifier bridge 74 having the usual rectifiers connected in each of the four branches thereof, and a pair of power windings P with one of the latter in series connection in each of two branches of the bridge. The input terminals of rectifier bridge 74 are connected to the secondary winding of transformer 18 through conductors 76a and 76b while the positive and negative output terminals of the bridge, corresponding to the output terminals of the amplifier, are connected to the reference windings of the load balancing amplifiers as hereinbefore described. Amplifier MA3 is also provided with a pair of negative feedback windings FB, four pairs of current balancing windings CB1-4, one pair for each drive section, and a pair of bias windings B. Feedback windings FB are series connected in a circuit extending from the positive terminal of bridge 74 through conductor 64 and adjustable resistors 78, 80, 82, 84 and 86 to the negative output terminal of the bridge. Resistor 78 is shunted by normally open contacts 1CR7 of relay 1CR and resistors 80, 82 and 84 are respectively shunted by normally open contacts 2CR7, 3CR7 and 4CR7 of corresponding relays of sections 6, 8 and 10 for reasons hereinafter described.

Current balancing windings CB1 are series connected to conductor 58 at one end and at the other end through conductor 60 to tap 24 of resistor 25 in the armature circuit of motor M as aforesaid. Current balancing winding pairs CB2, CB3 and CB4 are similarly connected at one end to conductors 58a, 58b and 58c, respectively, and at the other end through conductors 60a, 60b and 60c to taps on resistors 25a, 25b and 25c, respectively, for energization from the motor armature circuits of drive sections 6, 8 and 10, these connections being omitted from FIGS. 1a and 1b for the sake of simplicity. Bias windings B are connected across conductors 26a and 26b in series with an adjustable resistor 87.

Relay 1CR is provided with an operating coil 1CR1 in series connection with a normally open Start switch 88 and a normally closed Stop switch 90 across conductors 28a and 28b. A holding circuit is provided through normally open contacts 1CR2 in shunt of the Start switch to maintain coil 1CR1 energized independently of the latter.

Let it be assumed that single phase alternating current power is supplied to the primary winding of transformer 18 and through its secondary winding and then in a first branch through conductors 20a and 20b to the input terminals of armature supply magnetic amplifier MA1 of drive section 4 and to corresponding amplifiers in sections 6, 8 and 10; in a second branch through conductors 54a and 54b to the input terminals of load balancing amplifier MA2 of drive section 4 and to corresponding amplifiers in sections 6, 8 and 10; and in a third branch through conductors 76a and 76b to the input terminals of totalizing amplifier MA3. Let it also be assumed that direct current power is supplied to the positive and negative conductors 26a and 26b running along the lower portions of FIGS. 1a and 1b.

As a result, power windings P of amplifier MA1 are energized in the two branches of rectifier bridge 32 in series with the positive and negative output terminals of the latter, conductor 22a, armature A, conductor 22b and resistor 25. Similarly, power windings P of amplifier MA2 are energized in the two branches of rectifier bridge 52 in series with the positive and negative output terminals of the latter and resistor 50. And power windings P of amplifier MA3 are energized in the two branches of rectifier bridge 74, in a circuit extending through the positive output terminal of the latter and conductor 64 where the circuit divides. One branch extends through resistor 65, contacts 1CR4, resistor 70, terminal 69, contacts 2CR4, resistor 70a, contacts 3CR4, resistor 70b, contacts 4CR4, resistor 70c and conductor 72 to the negative output terminal of rectifier bridge 74. The other branch extends through resistors 78, 80, 82, 84 and 86 and negative feedback windings FB to the negative output terminal of amplifier MA3.

Bias windings B of amplifier MA1 are energized from conductors 26a and 26b through conductors 28a and 28b and resistor 44 while bias windings B of amplifier MA2 are energized across the aforementioned conductors 28a and 28b through rheostat 62. In addition, bias windings B of amplifier MA3 are energized across direct current conductors 26a and 26b in series with resistor 87.

Shunt field winding F of motor M is energized across conductors 28a and 28b through speed adjusting rheostat 30. Likewise, direct current power is supplied across the opposite ends of rheostat 46 through conductors 26a, 26b, 28a and 28b, and across the opposite ends of rheostat 42 from direct current conductors 26a and 26b.

Control networks 6b, 8b and 10b are similarly energized preparatory to operation of the drive.

Pressing Start switch 88 completes an energizing circuit for operating coil 1CR1 through Stop switch 90 across conductors 28a and 28b. Relay 1CR thus being energized closes contacts 1CR2 to complete a holding circuit in shunt of switch 88, and closes contacts 1CR3 to complete a circuit from the positive output terminal of amplifier MA3 through conductor 64, resistor 65, conductor 66, windings R, conductor 67, resistor 68, common point 69, contacts 2CR4, 3CR4 and 4CR4 and resistors 70a, 70b and 70c and conductors 72 to the negative output terminal of amplifier MA3 to energize reference windings R of amplifier MA2. Relay 1CR also opens contacts 1CR4 to interrupt the shunt circuit extending from the junction between resistor 65 and contacts 1CR3 through resistor 70 to common point 69. Relay 1CR closes contacts 1CR5 to complete an energizing circuit for load balancing windings LB of amplifier MA1 through resistor 48, arm 46a and the right-hand portion of rheostat 46 in parallel with resistor 50 and the left-hand portion of rheostat 46. Furthermore, relay 1CR closes contacts 1CR6 to complete an energizing circuit for speed reference windings SR of amplifier MA1 extending from arm 42a of rheostat 42 through conductor 40, terminal 38 and resistor 36 to conductor 28b, and closes contacts 1CR7 to shunt resistor 78 effectively out of the totalizing amplifier negative feedback windings circuit.

Let it be assumed that energization of relay 1CR also results in actuation of clutch 4a thereby coupling motor M to drive common shaft 12.

Control networks 6b, 8b and 10b may similarly be energized by operation of the start switches therein, thereby coupling sections 6, 8 and 10 to drive common shaft 12. As a result, contacts 2CR3, 3CR3 and 4CR3 close and contacts 2CR4, 3CR4 and 4CR4 open to connect control networks 6b, 8b and 10b in series with reference windings R of amplifier MA2 in a circuit extending from the positive output terminal of amplifier MA3 through conductor 64, resistor 65, contacts 1CR3, conductor 66, windings R, conductor 67, resistor 68, contacts 2CR3, conductor 66a, network 6b, conductor 67a, resistor 68a, contacts 3CR3, conductor 66b, network 8b, conductor 67b, resistor 68b, contacts 4CR3, conductor 66c, network 10b, conductor 67c, resistor 68c and conductor 72 to the negative output terminal of amplifier MA3.

The graph in FIG. 2, wherein output volts are plotted against input ampere turns, shows the characteristic curve C1 of motor armature supply amplifier MA1. Power windings P bias the amplifier toward its on condition while bias windings B bias the amplifier toward its off condition so that energization of these windings results in zero ampere turns to bias the amplifier off. The energization of speed reference windings SR is adjusted at rheostat 42 for some given speed such as will develop approximately 20 percent maximum speed reference ampere turns SRW, FIG. 2, whereby the amplifier is driven to substantially full voltage output. Tachometer generator TG is driven by motor M and generates current which is fed back to signal windings S. As a result, signal ampere turns SW are developed to drive the amplifier back to a preselected point OP on the straight portion of the characteristic curve slope. Thus, it should be apparent that the operating point can be moved up or down on the curve to respectively increase or decrease the amplifier output to motor M by controlling the direction and magnitude of energization of load balancing windings LB from zero value as indicated by arrows LBW in FIG. 2.

The closed loop system including armature A of motor M, tachometer generator TG and amplifier MA1 automatically maintains the amplifier output at a point OP preselected by adjustment of speed setting rheostat 42.

In the event the motor speed increases, tachometer generator TG is driven at a correspondingly faster rate. As a result, the enhanced reverse bias of signal windings S drives the operating point of amplifier MA1 down along curve C1 to decrease its output to armature A of the motor. Thus the motor slows down. Conversely, if the motor speed decreases from the preselected value, the output of generator TG correspondingly decreases and controls signal windings S to drive the operating point up along curve C1. As a result, the enhanced output of the amplifier effects an increase in motor speed to maintain the latter constant at the preselected value.

FIG. 3, wherein output volts are plotted against input ampere turns, graphically illustrates the operating characteristics of load current balancing magnetic amplifier MA2. Curve C2 depicts the output of the amplifier for different values of input ampere turns. Power windings P are energized to bias the amplifier toward its on condition while bias windings B are energized reversely to bias the same toward its off condition. The energization of bias windings B is adjusted at rheostat 62 to afford approximately one-half rated amplifier output at balanced load as indicated by line BW in FIG. 3. Signal windings S of amplifier MA2 are reversely energized, as a function of the motor load current, across the lower portion of resistor 25 in series with windings CB1 of amplifier MA3, while reference windings R of amplifier MA2 are forwardly energized from the positive and negative output terminals of amplifier MA3. The energization of reference windings R is adjusted at resistor 65 to develop opposing ampere turns to balance the ampere turns of signal windings S to maintain the amplifier at one-half rated output value at balanced load.

As a result, amplifier MA2 produces one-half rated output which is applied from the positive and negative output terminals across resistor 50 and in parallel with resistor 50 across the right-hand portion of load balancing rheostat 46 through contacts 1CR5, resistor 48, load balancing windings LB and arm 46a. Rheostat 46, being connected across the aforementioned direct current supply source, has a relatively large voltage drop thereacross and arm 46a is adjusted for zero current flow through load balancing windings LB. For example, assuming that the voltage drop across rheostat 46 is 100 volts in the direction indicated in FIG 1a and that the one-half rated output of amplifier MA2 is 30 volts. Then adjustment of arm 46a from zero voltage at the right-hand end of the rheostat to the 30 volt point results in zero current flow through the load balancing windings. Readjustment of arm 46a in the clockwise direction effects movement of the operating point of amplifier MA1 down along curve C1, FIG. 2, while adjustment of arm 46a in the counterclockwise direction effects movement of such operating point up along curve C1. Likewise, an increase or decrease in the output of amplifier MA2 effects respectively similar shifts in the operating point of amplifier MA1 as hereinafter described.

If the load current of motor M increases in relation to the other drive motors, the energization of both the signal and reference windings of amplifier MA2 increases, reversely relative to one another, the energization of signal windings S predominating to drive the operating point of amplifier MA2 downwardly along curve C2, FIG. 3, thus to decrease its output. Therefore, current flows in load balancing windings LB of amplifier MA1 in the reverse direction to shift operating point OP downwardly along curve C1 in FIG. 2 to change the motor load current back toward its preselected value.

Conversely, if the load current of motor M decreases in value in relation to the other drive motors, the energization of signal windings S and reference windings R of amplifier MA2 decreases. This change in load current is applied directly to the signal windings from resistor 25 and indirectly to the reference windings through amplifier MA3 in a lesser amount thereby to drive the operating point of amplifier MA2 up along curve C2 to increase its output. Therefore, current flows in load balancing windings LB of amplifier MA1 in the forward direction to shift operating point OP of amplifier MA1 upwardly along curve C1 to compensate for such motor load current variation. In this way, the system automatically readjusts the motor load current in response to change in load to maintain load balance.

When the load current of motor M increases or decreases as aforesaid to correspondingly alter the energization of reference windings R of amplifier MA2, it will be observed that a like change in energization occurs in the load balancing amplifier reference windings of drive sections 6, 8 and 10 as the latter windings are in series connection with windings R. This will produce a reverse effect on the outputs of the latter amplifiers. That is, while an increase in motor M load current effects a decrease in amplifier MA2 output as aforesaid, it will effect an increase in the outputs of the other load balancing amplifiers, assuming that the energization of the signal windings of the latter remains constant. Thus, drive sections 6, 8 and 10 will tend to take over some of the load of motor M until the load is rebalanced.

FIG. 4, wherein amplifier MA3 output is plotted against total input ampere turns to obtain transfer characteristic curve C3 without feedback and curves C4, C5, C6 and C7, graphically illustrates the operation of this totalizing magnetic amplifier and the effect of feedback recalibration when drive sections are connected in or disconnected from the system. In FIG. 4, bias windings B of amplifier MA3 bias the latter to cutoff at line CO. Curves C4, C5, C6 and C7 depict the amplifier ampere turns afforded by current balancing windings CB1, CB1-2, CB1-3 and CB1-4, respectively, while curve C3 depicts the operating characteristics of the amplifier without feedback.

Let it be assumed that all four drive sections are effectively connected in circuit to drive common shaft 12. Thus, current balancing windings CB1-4 are energized in the positive direction to drive amplifier MA3 to point 4CB on characteristic curve C3. Under these conditions, the control relays of all four sections are energized so that contacts 1CR7, 2CR7, 3CR7 and 4CR7 are closed and resistors 78, 80, 82 and 84 shunted effectively out of circuit. As a result, the current flowing through negative feedback windings FB has a value providing negative feedback ampere turns FB4 to drive the amplifier to operating point O at the upper end of the characteristic curve slope to provide an output voltage V.

Let it be assumed that drive section 10 is disconnected by pressing the stop switch therein. As a result, clutch 10a is disengaged from shaft 12 and control network 10b is disconnected by opening of contacts 4CR3. Contacts 4CR4 close to insert resistor 70c in place of control network 10b. The impedance of resistor 70c is equal in value to the combined impedances of resistor 68c and the reference windings of the load balancing amplifier (corresponding to windings R in network 4b) so that disconnection of section 10 does not alter the value of current flowing in the load balancing amplifier reference windings in the remaining drive sections.

Disconnection of section 10 effects deenergization of current balancing windings CB4 to decrease the input to amplifier MA3 to point 3CB in FIG. 4 and opening of contact 4CR7 to insert resistor 84 effectively in circuit with negative feedback windings FB. This decreases the current in the latter to reduce the feedback ampere turns to the value FB3 in FIG. 4 to maintain the output voltage of amplifier MA3 constant at point O. Similarly, when second and third drive sections are disconnected, current balancing windings CB3 and CB2 are deenergized and resistors 84 and 82 are inserted to maintain the output of amplifier MA3 substantially constant.

Assuming that the total load remains constant when motors are disconnected from the system, the load per motor will naturally increase. As a result, the system will function automatically as hereinbefore described to reapportion such total load in the predetermined ratio among the remaining motors.

It will be apparent from FIG. 4 that if a single drive section is operated to drive shaft 12, current balancing windings CB1 alone will be energized to afford input ampere turns CB1. The value of resistor 78 is selected so that shunting the latter affords negative feedback ampere turns FB1 to bias the amplifier to operating point O. Resistors 78, 80, 82 and 84 may have equal values so as to maintain the same output level of the amplifier when selected motors are cut in or out of service. With the aforementioned resistors being of equal value, going from one motor to two motors will effect a small variation in the operating level of amplifier MA3. However, the value of resistor 86 may be adjusted so that connection of an increasing number of motors effects a corresponding decrease in variation of the operating level from point O. Thus, operation of a plurality of motors renders such error negligible.

Rheostat 46 in network 4b and the corresponding rheostats in networks 6b, 8b and 10b may be adjusted for equal or unequal load currents among the motors as desired. In the event the aforementioned rheostats are adjusted for a balanced condition wherein the four motors share the total load equally, disconnection of one motor effects recalibration of totalizing amplifier MA3 by means of negative feedback windings FB to maintain the loads of the remaining three motors in balance. In the event the aforementioned rheostats are adjusted so that selected motors carry more or less load, disconnection of one motor effects recalibration of amplifier MA3 to maintain its output level constant for a given load on the motors. Thus, readjustment of rheostat 46 predetermines the portion of the total load to be shared by the respective motor.

In FIG. 5 certain elements have been given reference characters corresponding to those employed to indicate like parts in FIGS. 1a and 1b.

In the modification shown in FIG. 5, control networks 4b and 10b are identical to that shown in FIG. 1 and therefore have been schematically shown for simplicity. Additional drive sections may be similarly connected in the system as indicated by the broken lines between networks 4b and 10b.

The system shown in FIG. 5 differs from FIGS. 1a and 1b primarily in the method of totalizing the load currents by means of an integrating transformer. Also modified means are employed for deriving the load current feedback signals.

As schematically shown in FIG. 5, the system comprises a plurality of drive sections 4 and 10 drivingly connected to a common driven shaft 12, clutches 4a and 10a, control networks 4b and 10b, transformer 18 for supplying alternating current power to the control networks through conductor pairs 20a—20b and 54a—54b, direct current conductors 26a and 26b, speed setting rheostat 42 having an adjustable arm 42a for supplying direct current through terminals 38 and 38c to networks 4b and 10b in parallel, and in each network a relay such as 1CR having an operating coil 1CR1 and contacts 1CR2-7, all as described in connection with FIGS. 1a and 1b.

Drive section 4 is provided with a current measuring saturable reactor 100 inductively coupled to conductor 22b of the motor armature circuit for deriving the load current feedback signal. An integrating transformer 102 having a plurality of transformer winding sections 102a and 102b is provided at the lower portion of FIG. 5 for totalizing the load currents.

Reactor 100 is series connected with the input terminals of full wave rectifier bridge 104 and the primary winding of transformer section 102a across the secondary winding of power transformer 18 through conductors 20a, 106 and 60, normally open contacts 1CR7 of relay 1CR and conductor 108. The positive and negative output terminals of rectifier bridge 104 are connected to conductor 58 and resistor 56, respectively, and through the latter (as shown in FIG. 1a) across the signal windings of the load balancing magnetic amplifier.

Drive section 10 is likewise provided with a current measuring reactor 110 and a full wave rectifier bridge 112 series connected with the primary winding of transformer section 102b and normally open contacts 4CR7 in parallel with the corresponding elements of drive section 4. The secondary windings of transformer section 102a and 102b are connected in a loop circuit in series with the input terminals of a full wave rectifier bridge 114, normally open contacts 1CR3 of relay 1CR, conductor 116, the input terminals of full wave rectifier bridge 118, normally open contacts 4CR3 of the control relay of drive section 10 and conductor 120. The positive and negative output terminals of rectifier bridge 114 are connected to conductors 66 and 67, respectively, and through the latter (as shown in FIG. 1a) to the reference windings of the load balancing amplifier of control network 4b. The positive and negative output terminals of rectifier bridge 118 are connected to corresponding conductors 66c and 67c extending into control network 10. Relay 1CR is additionally provided with normally closed contacts 1CR4 for effectively shunting the secondary winding of transformer unit 102a, rectifier bridge 114 and normally open contacts 1CR3 out of the aforementioned transformer secondary loop circuit when operating coil 1CR1 is deenergized. Drive section 10 is provided with corresponding normally closed contacts 4CR4 for like reasons.

While two drive sections have been shown in FIG. 3, it will be apparent that additional drive sections may be connected therebetween and to the open conductors extending from the right-hand side of drive section 10, each additional drive section also having an integrating transformer section.

Let it be assumed that single phase alternating power is supplied to the primary winding of transformer 18 and through its secondary winding and conductors 54a—54b and 20a—20b in parallel to energize control networks 4b and 10b as hereinbefore described. Pressing of the aforementioned start switch results in energization of operating coil 1CR1 of relay 1CR and closure of contacts 1CR2, 1CR5 and 1CR6 to energize control network 4b as hereinbefore described. Relay 1CR also closes contacts 1CR7 to complete an energizing circuit for the primary winding of transformer section 102a from conductor 54a through conductors 20a and 106, reactor 100, conductor 60, the input terminals of rectifier bridge 104 and conductor 108 to conductor 54b. The signal windings (FIG. 1a) of the load balancing amplifier of network 4b are reversely energized across the positive and negative output terminals of bridge 104 through conductor 58 and resistor 56. Relay 1CR in addition closes contacts 1CR3 and opens contacts 1CR4 to complete an energizing circuit for rectifier bridge 114 across the secondary winding of transformer unit 102a through conductor 116, contacts 4CR4 and conductor 120. The reference windings (FIG. 1a) of the load balancing amplifier of network 4b are forwardly energized across the positive and negative output terminals of bridge 114 through conductors 66 and 67.

Drive section 10 may be similarly connected effectively in circuit. Thus, pressing the start switch in control network 10b results in energization of the latter as hereinbefore described. Also contacts 4CR7 close to complete an energizing circuit for the primary winding of transformer unit 102b in series with reactor 110 and rectifier bridge 112 across the corresponding elements of drive section 4. Contacts 4CR3 close and contacts 4CR4 open to connect the secondary winding of transformer unit 102b and rectifier bridge 118 in a loop circuit with the corresponding elements of drive section 4 through conductors 116 and 120.

Intergrating transformer 102 is a current transformer working at low excitation on the principle of matching primary and secondary ampere turns. Let it be assumed that four drive sections, two being shown in FIG. 5, are operatively connected in circuit to drive common shaft 12. As shown in FIG. 5, a transformer section primary winding is provided for each of the drive sections, such primary windings of the respective drive sections being energized in parallel from the alternating current power supply source. The total primary ampere turns equal the sum of the ampere turns of the individual primary windings. With all four secondary windings connected in series, the ampere turns of each secondary winding equal one-quarter of the total primary ampere turns. As the signal windings of each load balancing amplifier are connected in circuit with each primary winding and the reference windings of each load balancing amplifier are connected in series circuit with all four secondary windings, the reference windings will have the same number of turns as the signal windings for equal number of primary and secondary turns in order to cancel the effect of the signal windings under conditions of proper load division between the drives.

When a selected drive section is effectively disconnected from the system by pressing its stop button, the primary and secondary windings of its associated integrating transformer section are disconnected from the system at contacts such as 1CR3 and 1CR7, for example, and such drive section declutched and deenergized as hereinbefore described. With the total load remaining constant, this results in an increase in the primary currents of the remaining transformer sections to maintain the total primary ampere turns constant. For equal primary and secondary turns, the current in the secondary windings correspondingly increases. As a result the ampere turns of the signal and reference windings of the load balancing amplifiers remaining in the system cancel one another to maintain the preselected load current balance between the operating drive sections. Thus, the total load is reapportioned among the lesser number of motors. When further drive sections are disconnected, the integrating transformer functions in a similar manner to maintain load current balance between the remaining motors.

Proportioning of the load between the drive sections may be altered as desired by adjustment of the load balancing rheostats of the associated drive sections while the motor speed is preselected at rheostats 30 and 42.

The preselected motor speed is automatically maintained constant through tachometer generator feedback as described in connection with FIGS. 1a and 1b. Should the motor load current in conductor 22b increase in value, the saturation of load current measuring reactor 100 correspondingly increases to enhance the current flow through the signal windings of amplifier MA2 and the primary winding of transformer section 102a. As a result, the transformer secondary current increases but in lesser proportion to the increase in the primary current, thus resulting in net negative ampere turns of the signal and reference windings of the load balancing amplifier of drive section 4 to decrease the output of the latter amplifier. Consequently, reverse current flows in the load balancing windings of the armature supply amplifier to compensate for such motor load current variation in drive section 4.

As the secondary windings of the transformer sections are connected in series, the increased secondary current effects net positive ampere turns of the signal and reference windings of the other load balancing amplifiers. Thus, these other drive sections will tend to take over some of the load from drive section 4 until the load is rebalanced.

Conversely, when the motor load current of drive section 4 decreases, the signal and reference windings of the load balancing amplifiers initiate a complementary control function to rebalance the load.

I claim:

1. In a load balancing system for a plurality of drive sections adapted to be coupled to a common driven device, each of said drive sections having an electrical motor, the combination with individual energizing control means for supplying adjustable voltage to each of said motors, of means for operating a selected number of said energizing control means to initiate operation of the corresponding motors, and control means effective when said selected number of the motors are rendered operative for controlling said energizing control means to apportion among the selected motors predetermined values of a given total load and thereafter to maintain the load ratios of such motors constant at said predetermined values.

2. In a system for controlling a plurality of motors coupled to a common driven device, a plurality of energizing control means for the motors there being one energizing control means for supplying adjustable voltage to each motor, means in each said energizing control means for preselecting for the corresponding motor the relative portion of the load to be shared thereby, means for rendering a selected number of the energizing control means effective thereby to initiate operation of the corresponding motors, and means effective when said selected number of the motors are rendered operative for apportioning among the same said pre-selected portions of the load.

3. The invention defined in claim 2, wherein the last mentioned means comprises means responsive to disconnection of a selected motor from the system for independent operation for reapportioning the load among the remaining motors in accordance with said preselection.

4. The invention defined in claim 3, wherein the last mentioned means comprises means responsive to reconnection of said selected motor operatively in the system for affording such motor the portion of load preselected therefor and for affording the remaining motors said preselected portions of load.

5. The invention defined in claim 4, wherein the last mentioned means comprises means responsive to variation in the load current of one of said motors from a preselected value for effecting a compensating adjustment in energization of said one motor to maintain the preselected load division among the motors.

6. The invention defined in claim 4, wherein the last mentioned means comprises means responsive to variation in a motor load current from a preselected value for effecting compensating adjustments in energization of said plurality of motors to maintain said preselected relative portions of load on the motors.

7. The invention defined in claim 5, together with means responsive to variations in the speeds of said motors for controlling said energizing means to maintain said motor speeds constant at a predetermined value.

8. The invention defined in claim 2, wherein the last mentioned means comprises means integral therewith and responsive to disconnection of a motor from the system for independent operation for maintaining the load ratios of the remaining motors at said preselected values, said integral means comprising first means common to said motors for measuring the total load of said remaining motors, second means individual to said motors for measuring the load of each remaining motor, means responsive to said first and second means for comparing a function of each motor load with a function of said total load to provide error signals in proportion to motor load variations from said preselected values, and means individual to said motors and responsive to said error signals for compensating such load variations.

9. In a load balancing system for a plurality of direct current motors adapted to be coupled to a common driven device adjustable voltage control means for each motor for energizing said motors, manual control means for disassociating selected motors from said system for independent operation, and means responsive to disassociation of any one or more selected motors from said system for controlling the adjustable voltage control means of the remaining motors to automatically maintain predetermined load division between the remaining motors.

10. The invention defined in claim 9, together with adjustable means for preselecting a desired speed for said motors, and means responsive to variation of a motor speed from said desired value for rendering said adjustable means effective to automatically adjust the energization of such motor to counteract such speed variation.

11. In a load controlling system for a plurality of drive sections coupled to a common driven device, the combination with a plurality of direct current motors and individual energizing control means for the motors, of means for preselecting for the motors the ratios of the load to be shared thereby, means responsive to operation of said individual energizing control means to render said motors operative for affording the motors said preselected loads, and means responsive to variation in any motor load current from a preselected value for controlling said individual energizing control means to automatically adjust the energization of the plurality of motors to maintain said preselected load ratios.

12. In a load controlling system for a plurality of drive sections coupled to a common driven device, the combination with a plurality of direct current motors and individual energizing control means for supplying adjustable voltage to initiate energization and operation of the motors, of means for preselecting for the motors equal or unequal ratios of the load to be shared thereby, means in said individual energizing control means effective when said motors are rendered operative for providing the motors with said preselected loads, means for disconnecting a selected motor energizing control means from the system, and means responsive to disconnection of any selected motor control means from the system for controlling the energizing control means for the remaining motors to automatically reapportion the load among the remaining motors in accordance with the preselected ratios of the latter.

13. In a load balancing system for a plurality of individual drives coupled to a comon driven device, an electric motor in each of said drives, a plurality of controllable energizing means for energizing the respective motors, means for disassociating a selected motor from said system for independent operation, means comprising a totalizing static device for measuring the total load current of the remaining motors, means comprising a plurality of static devices for measuring the individual load currents of the remaining motors, means comprising a plurality of static devices for comparing a function of each motor load current with a function of said total load current to provide error signals which are functions of motor load current variations from predetermined values, and means responsive to said error signals for controlling the energizing means of said remaining motors to reapportion the load among the remaining motors thereby to maintain load current balance among the operating drives.

14. In a load balancing system, in combination, a plurality of electrical motors coupled to a common driven device, individual energizing control means for each of said motors, a load balancing saturable reactor for each of said motors for controlling the respective energizing control means, the outputs of said saturable reactors being adjusted for zero inputs to said energizing control means when the load current of each motor equals a predetermined portion of the total load current to afford reversible control of said energizing control means, a totalizing device coupled to said motors for deriving a signal as a function of the total load current and applying said signal to said load balancing saturable reactors, means for deriving a signal from each motor as a function of its individual load current and applying the same to the associated load balancing reactor for comparison with the first mentioned signal to derive a first error signal if such load current exceeds said predetermined portion and to derive a second signal if such load current is less than said predetermined portion, the associated load balancing reactor responding to said error signals to control said energizing control means thereby to maintain predetermined ratio of load currents between the motors.

15. The combination according to claim 14, together with recalibrating means for said totalizing device responsive to disconnection of a motor from said system for independent operation for modifying the total load current signal thereby to maintain load current balance between the remaining motors.

16. The combination according to claim 14, wherein said totalizing device is a saturable reactor amplifier comprising a plurality of current balancing windings respectively energized as a function of the motor load currents when the motors are energized and a negative feedback winding for recalibrating said amplifier to modify its output for a change in load on the motors.

17. The combination according to claim 14, wherein said totalizing device is an integrating transformer having a plurality of primary windings respectively energized as a function of the motor load currents when the motors are energized, and a plurality of secondary windings matching the respective primary windings and connected in circuit with said load balancing saturable reactors.

18. The combination according to claim 17, together with means effective when a selected motor is disassociated from the system for independent operation for de-energizing a primary and a secondary winding section of said integrating transformer while modifying the total load current signal thereby to maintain load balance between the remaining motors.

References Cited in the file of this patent

UNITED STATES PATENTS

| | | |
|---|---|---|
| 1,631,752 | Merrill | June 7, 1927 |
| 2,673,315 | Seeger | Mar. 23, 1954 |
| 2,752,545 | Halter | June 26, 1956 |